(12) United States Patent
Ohashi et al.

(10) Patent No.: US 6,430,811 B1
(45) Date of Patent: *Aug. 13, 2002

(54) CATALYST CONTAINER

(75) Inventors: Sadaaki Ohashi, Shizuoka-ken;
Shuichi Nishizaki, Tochigi-ken;
Kouzou Suganuma, Tochigi-ken;
Yasushi Kageyama, Tochigi-ken, all of (JP)

(73) Assignee: Kabushiki Kaisha Yutaka Gieken, Shizuoka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,696

(22) Filed: Apr. 27, 1998

(30) Foreign Application Priority Data

Apr. 28, 1997 (JP) .............................. 9-111257
May 23, 1997 (JP) .............................. 9-133352

(51) Int. Cl.[7] .............................. F01N 3/28; F01N 7/14; B01D 53/94
(52) U.S. Cl. .......................... 29/890; 422/177; 422/179
(58) Field of Search .................. 422/171, 177, 422/179, 180, 174; 60/299, 300; 55/DIG. 30; 29/890

(56) References Cited

U.S. PATENT DOCUMENTS

| | | | | |
|---|---|---|---|---|
| 3,854,888 A | * | 12/1974 | Frietzsche et al. | 422/179 |
| 3,958,312 A | * | 5/1976 | Weaving et al. | 29/890 |
| 4,070,158 A | | 1/1978 | Siebels | 422/179 |
| 4,101,280 A | * | 7/1978 | Frietzsche et al. | 422/180 |
| 4,148,120 A | | 4/1979 | Siebels | 422/179 |
| 4,278,639 A | * | 7/1981 | Tadokoro et al. | 422/180 |
| 4,285,909 A | * | 8/1981 | Mizusawa et al. | 422/179 |
| 4,969,264 A | * | 11/1990 | Dryer et al. | 422/179 |
| 5,028,397 A | * | 7/1991 | Merry | 422/179 |
| 5,106,588 A | * | 4/1992 | Sims et al. | 422/180 |
| 5,280,142 A | | 1/1994 | Keller | 181/211 |

FOREIGN PATENT DOCUMENTS

| | | |
|---|---|---|
| EP | 0 263 893 | 4/1988 |
| GB | 1 406 704 | 9/1975 |
| GB | 1 572 404 | 7/1980 |
| JP | 63-1428 | 1/1988 |
| JP | 6-294311 | 10/1994 |
| JP | 7-54630 | 2/1995 |

* cited by examiner

*Primary Examiner*—Hien Tran
(74) *Attorney, Agent, or Firm*—Arent Fox Kintner Plotkin & Kahn, PLLC

(57) ABSTRACT

A cylindrical body of a catalyst container has that overlapped portion of a rolled sheet of metal which is welded in an axial direction of the cylindrical body. A coned portion is welded, at a large diameter portion thereof, to each axial end of the cylindrical body. The large diameter portion of the coned portion has a flange which extends radially outward, and the axial end of the cylindrical body is brought into abutment with an outward end surface of the flange and is fillet-welded along an outer corner which is formed by the flange and the cylindrical body. A heat shield cover is mounted under the casing by connecting a second flange connected to a front end of a downstream exhaust gas pipe to a first flange connected to a rear end of the casing. The heat shield cover is made up of a mounting flange portion and a cover portion. The mounting flange portion is extended so as to abut with an upstream surface of a lower part of the first flange. The cover portion is bent backward and forward to cover the bottom surfaces of the rear coned portion and the first and second flanges. The heat shield cover is connected to the first and second flanges with bolts and nuts by inserting the bolts from the side of the mounting flange portion.

1 Claim, 5 Drawing Sheets

CATALYST CONTAINER

BACKGROUND OF THE INVENTION

1. Field of the Invention

The present invention relates to a catalyst container which is used for containing therein catalysts for purifying exhaust gases from an internal combustion engine. In particular, it relates to a simpler construction of the catalyst container itself as well as to a catalyst container with a heat shield cover. The heat shield cover is to prevent the damages to the surroundings such as the road surface or the like by the heat which is radiated from the bottom surface on the downstream side of the catalyst container.

2. Description of the Related Art

As this kind of catalyst container itself, there is known the following, e.g., in Japanese Published Unexamined Patent Application No. 1428/1988. Namely, the catalyst container is normally made up of a cylindrical member for containing therein catalysts, and coned connection members which are connected to both ends, as seen in the axial direction, of the cylindrical member and which are respectively tapered so as to become smaller in diameter in a direction away from the cylindrical member. This cylindrical member is made up of two longitudinally segmented halves (i.e., segmented in the axial direction). A substrate or a catalyst support block is sandwiched inside these two segmented halves. The segmented halves are thereafter welded together at flanges which are provided along the divided surfaces of the halves to thereby integrally assemble the constituent members together. The catalyst container of this kind of construction has the following disadvantages. Namely, a metallic mold for forming the segmented halves becomes large in size. Further, there are required additional members for aligning the substrate relative to the catalyst container itself, as well as members for hermetically sealing the catalyst container, resulting in a higher cost.

Aside from the above-described conventional catalyst container itself, there is also known the following in U.S. Pat. No. 4,070,158 in which tapered members are welded together. Namely, as shown in FIGS. 12A and 12B, a casing "a" of this catalyst container is made up of a cylindrical portion b and coned portions c, c. A catalyst carrier body d around which is rolled a ceramic fiber mat (sealing mat) e is contained or accommodated inside the cylindrical portion b. The cylindrical portion b is formed of a plate member such that the inner diameter becomes smaller than D, as illustrated in FIG. 12B, with an allowance $b_1$ for overlapping the circumferential both ends. In assembling, the inner diameter of the cylindrical portion b is forcibly expanded against the elastic force to thereby insert thereinto the catalyst carrier body d around which is rolled the sealing mat e. The forcibly expanded cylindrical portion b is then allowed to become free to thereby cause the tightening force due to the restoring force of the cylindrical portion b to operate. In this state the axially extending overlapped end portion $b_2$ of the rolled cylindrical portion b is then welded. Thereafter, the large diameter portion $C_1$ of each of the coned or tapered portions C is inserted into the cylindrical portion b. In this manner, the cylindrical portion b and the end portion of each of the sealing mats e are held together in position by means of an inwardly bent collar $C_2$ which is formed in the large diameter end of the tapered portion C. The cylindrical portion b and the tapered portion C are then welded together at a circumferentially extending welding portion $C_3$.

It is possible with this casing "a" to hold the catalyst carrier body d in a hermetically sealed manner. However, since the inner diameter D cannot always be made constant to a certain fixed dimension, there is a possibility that a clearance occurs between the large diameter portion $C_1$ and the cylindrical portion b, or conversely that the large diameter portion $C_1$ is too large to be inserted into the cylindrical portion b depending on the relative sizes of both portions b, $C_1$. Further, the machining work of drawing the inwardly bent collar $C_2$ is not easy.

As the catalyst container with a heat shield cover in order to prevent the heat radiation from the bottom surface of the catalyst container to the surroundings such as onto the road surface, or the like, it is normal practice to mount the heat shield cover by means of welding or caulking to the container case of the catalyst container. If this kind of mounting arrangement is employed, it is impossible to replace only the cover and, consequently, the cover must be replaced together with the catalyst carrier itself. Further, there is also known one in which the heat shield cover is mounted by means of bolts and nuts (e.g., in Japanese Published Examined Utility Model Registration Application No. 26008/1982). If an arrangement is made, like the above embodiment, that the entire bottom surface is covered with the heat shield cover, the heat shield cover becomes large in size, and a large number of fixing parts such as bolts, nuts or the like must be used. As a result, the costs for parts and for assembling become higher. Further, in recent catalyst containers, the catalyst carriers are often wrapped with sealing mats which have thermally insulating characteristics. In the catalyst containers of this kind of construction, there is no need of covering also that part of the catalyst carrier which is wrapped with the sealing mat.

In view of the above points, the present invention has an object of providing a catalyst container in which the forming and welding of the coned portion are easy. It is another object of the present invention to provide a catalyst container in which the heat shield cover is light in weight and small in size and the cover alone can be replaced, and in which a special member is not required for mounting the heat shield cover on the catalyst container.

SUMMARY OF THE INVENTION

In order to attain the above and other objects, according to a first aspect of the present invention, there is provided a catalyst container comprising: a columnar porous catalyst carrier; a sealing mat surrounding an outer circumferential surface of the catalyst carrier; a cylindrical body surrounding an outer circumferential surface of the sealing mat, the cylindrical body having that overlapped portion of a rolled sheet of metal which is welded in an axial direction of the cylindrical body; a coned portion welded, at a large diameter portion thereof, to each axial end of the cylindrical body; wherein the large diameter portion of each of the coned portions has a flange which extends radially outward, and wherein each of the axial ends of the cylindrical body is in contact with an outward end surface of the flange and is fillet-welded along an outer corner which is formed by the flange and the cylindrical body.

According to this catalyst container, the flange on the large diameter portion of the coned portion extends outward. Therefore, the forming of the flange is easy. Further, as long as the inner diameter and outer diameter of the coned portion fall within the width of the flange, the assembling can be carried out. It follows that the cylindrical body can be reduced in diameter by operating a sufficient tightening force to the sealing mat. The airtightness and the positioning of the catalyst carrier can thus be made surely. The welding portion between the flange and the cylindrical body can provide a sufficient allowance for welding by subjecting the flange to fillet welding with the cylindrical body. Therefore, the welding portion can attain a large welding strength.

Preferably, each of said axial ends of the cylindrical body is aligned so as to be substantially in the center of the flange.

According to this feature, that inner diameter of the end of the coned portion which is formed by the inner circumference of the flange is smaller in diameter than the inner diameter of the cylindrical body. Therefore, the flow of the exhaust gases which enter from the coned portion into the cylindrical body can be prevented from striking the end of the sealing mat. The damages to the end of the sealing mat can thus be avoided.

According to a second aspect of the present invention, there is provided a catalyst container comprising: a casing having a cylindrical body for containing a catalyst carrier body inside the cylindrical body; a rear coned portion which extends rearward from a rear end of the casing, the rear coned portion having a first flange connected to a rear end thereof; a heat shield cover which is mounted under the casing by connecting a second flange connected to a front end of a downstream exhaust gas pipe to the first flange with bolts and nuts; wherein the heat shield cover comprises a mounting flange portion and a cover portion, the mounting flange portion being extended so as to abut with an upstream surface of a lower part of the first flange and having bolt holes which are coaxial with bolt holes of the first flange, the cover portion being bent backward and forward to cover the bottom surfaces of the rear coned portion and said first and second flanges, said heat shield cover being connected to the first and second flanges with bolts and nuts by inserting the bolts from the side of the mounting flange portion.

Preferably, the cover portion of the heat shield cover comprises: a rear cover portion which is bent from the mounting flange portion rearward to cover the bottom surfaces of the first and second flanges; an intermediate portion which is bent forward from the rear cover portion; and a front cover portion which extends further from the intermediate portion to cover the bottom surface of the rear coned portion.

According to the second aspect of the present invention, the heat shield cover can be mounted with the bolts that are used to couple the flange on the catalyst container and the flange on the exhaust gas pipe on the downstream side. Therefore, the number of parts can be reduced. In addition, only the rear coned portion and the two flanges that are heated to a high temperature by the exhaust gases are covered by the heat shield cover. Therefore, the necessary heat shielding function can be attained by a minimum number of parts.

In assembling the heat shield cover to the catalyst container, bolts are inserted from a front side of the flange through the two flanges. The bolts are respectively fitted with nuts and are tightened for fixing the heat shield cover in position. In this arrangement, since that side on the nuts is not covered with the heat shied cover, a tightening tool can be easily operated in the available space. The assembling can thus be efficiently performed.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Detailed explanations will now be made about preferred embodiments of the present invention.

Figure 1:
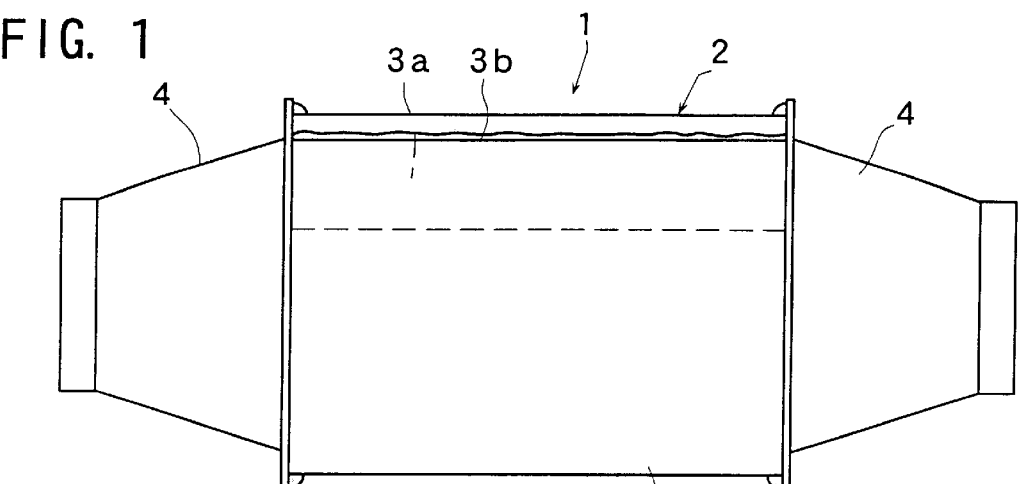
FIG. 1 is a side view of a first embodiment of the catalyst container of the present invention.
Figure 2:
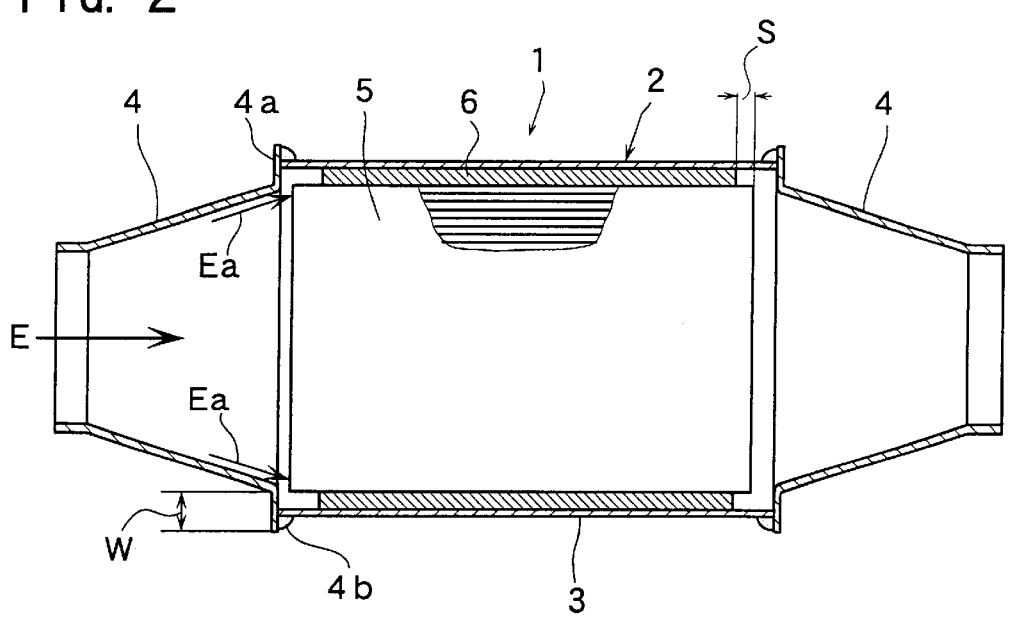
FIG. 2 is a longitudinal sectional view thereof.
Figure 3:
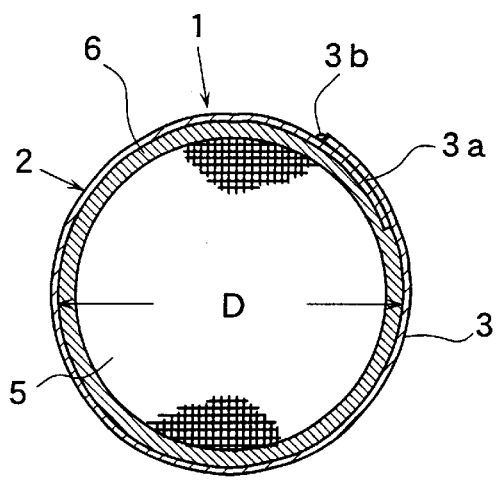
FIG. 3 is a front sectional view thereof.

In FIGS. 1 through 3, reference numeral 1 denotes a catalyst container, reference numeral 2 denotes a casing thereof, reference numeral 3 denotes a cylindrical body or portion of the casing 2, reference numerals 4, 4 denote coned portions which constitute the passage for exhaust gases from an internal combustion engine of a motor vehicle. Inside the cylindrical body 3 there is contained a porous columnar catalyst carrier body 5 in a state in which a sealing mat 6 is rolled around. The sealing mat 6 is a mat made of thermally expansive fibers whose chief components are $SiO_3$, $Al_2O_3$, or the like. It is superior in thermal insulation characteristics and elasticity and has airtightness (or is impervious to fluid) in a compressed state.

The cylindrical body 3 is formed by rolling a rectangular metallic sheet plate into a cylindrical shape in a manner to partly overlap at circumferential ends. The dimension or allowance 3a for overlapping in one circumferential end of the metallic sheet plate is overlapped with the other end thereof. The overlapped portion is then welded along the longitudinally or axially extending welding line 3b. Suppose that the inner diameter of the cylindrical body 3 is D after the catalyst carrier body 5 has been assembled into the cylindrical body 5. It is then so formed that the inner diameter of the cylindrical body 3 becomes smaller than the diameter D in its free state. The rolled cylindrical body 3 thus obtained is radially enlarged or expanded against the resilient force by means of a tool such as a hook or the like. The catalyst carrier 5 having the sealing mat 6 rolled therearound is then inserted or accommodated into the enlarged cylindrical body 3. Once the cylindrical body 3 is returned to its free state, a compression force is applied to the sealing mat 6 to thereby hold the catalyst carrier 5 in position.

In this state, or by applying a compression force to the rolled cylindrical body 3 by means of another pressing member, the compression force is increased. The longitudinally extending ends are welded together along the welding line 3b. The catalyst carrier 5 is thus held inside the cylindrical body 3 in elastic, thermally insulating, and hermetic states via the sealing mat 6. The sealing mat 6 may be equal in length to the catalyst carrier 5. However, as shown in FIG. 2, the sealing mat 6 may also be formed a little shorter in length so as to form a clearance S. There is no substantial difference between this arrangement and the above-described arrangement in point of functions of holding the catalyst carrier 5 and of the hermetic sealing.

In each of the coned portions 4 there is formed, on a large diameter side thereof, an outwardly extending flange 4a whose width is W. An outer corner portion which is formed by the abutment of the end of the cylindrical body 3 with an intermediate portion of the width W is connected by fillet welding 4b.

By arranging the width W of the flange 4a and the diameter of the cylindrical body 3 as described above, it is possible to secure a sufficient allowance or dimension for welding. Further, since the coned portion 4 of the flange 4a becomes smaller than the inner diameter of the cylindrical body 3, it is possible to prevent the flow Ea of the exhaust gases E along the outer circumference from striking the end portion of the sealing mat 6. The damages to the end portion thereof can thus be prevented.

An explanation will now be made about an embodiment in which the catalyst container is provided with a heat shield cover.

Figure 4:
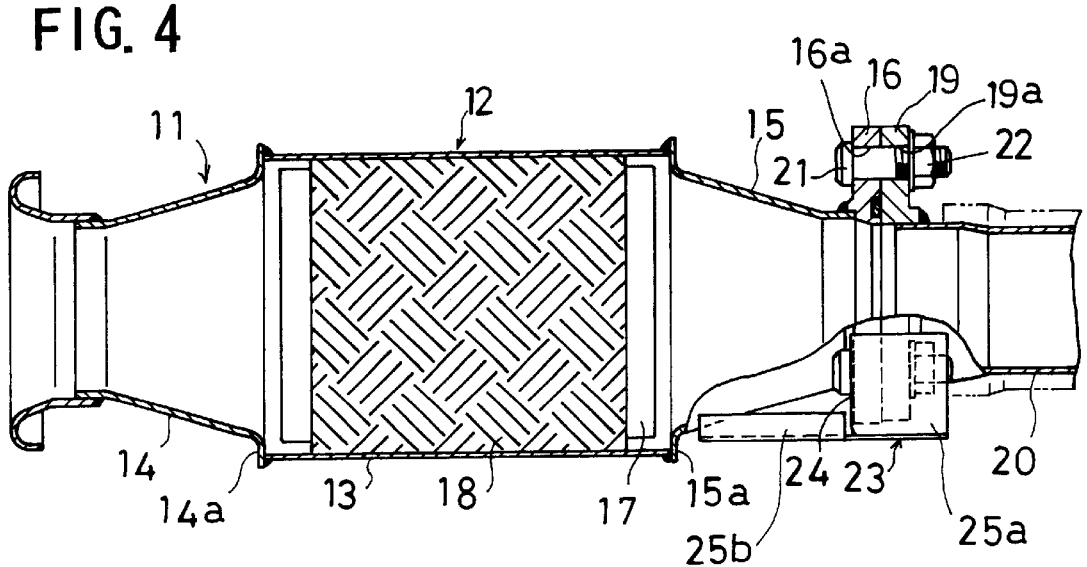
FIG. 4 is a longitudinal sectional view of a second embodiment of the catalyst container of the present invention.
Figure 5:
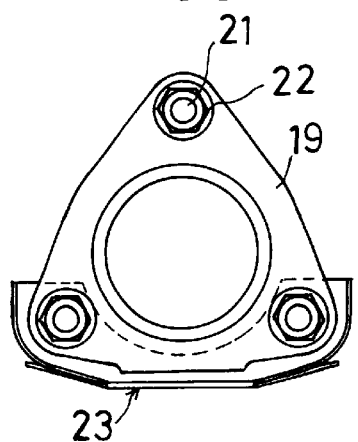
FIG. 5 is a rear view thereof.
Figure 6:
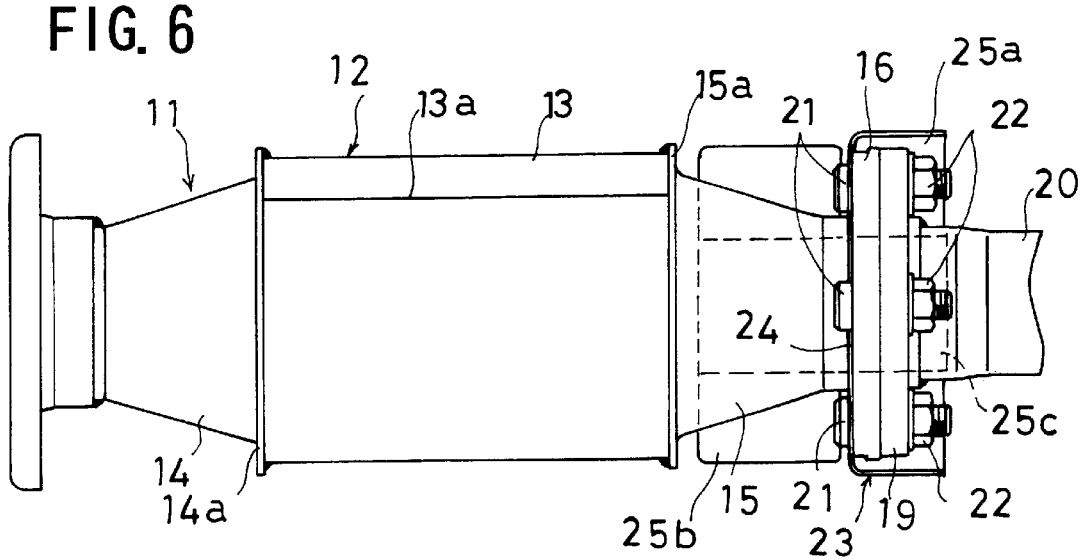
FIG. 6 is a plan view thereof.
Figure 7:
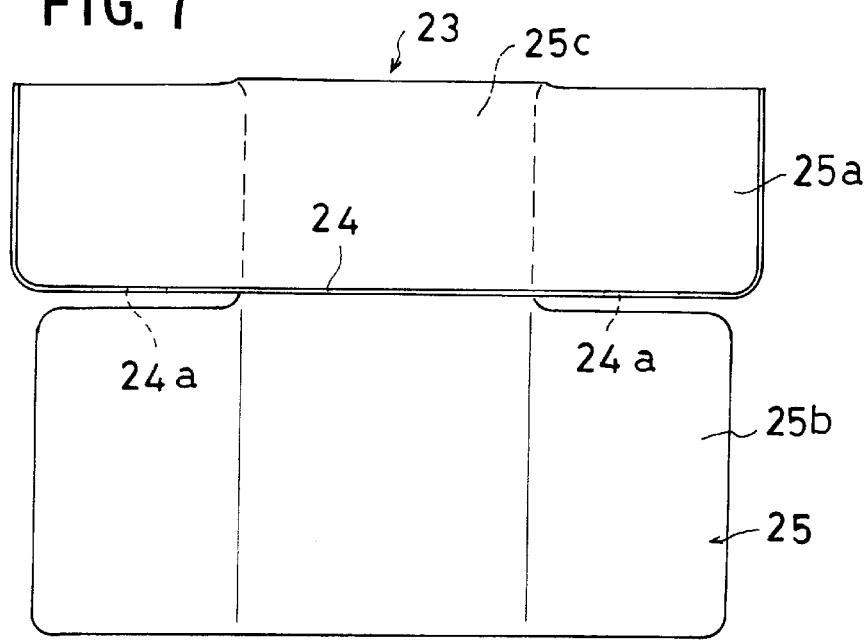
FIG. 7 is a plan view of a heat shield cover.
Figure 8:
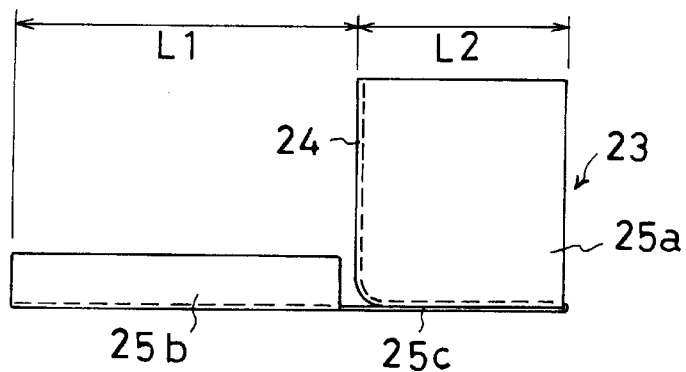
FIG. 8 is a side view thereof.
Figure 9:
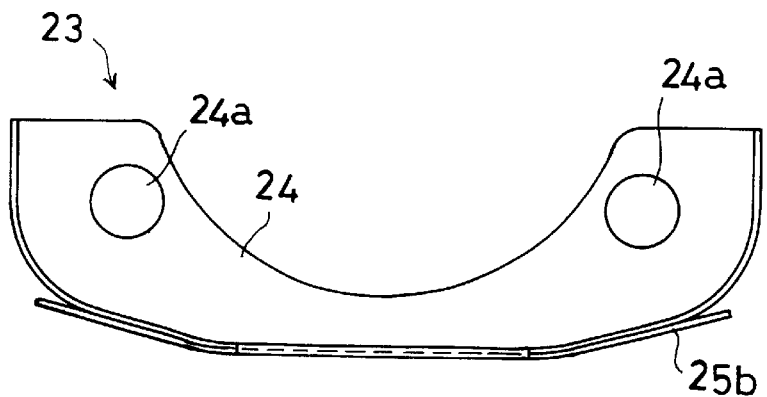
FIG. 9 is a rear view thereof.
Figure 10:
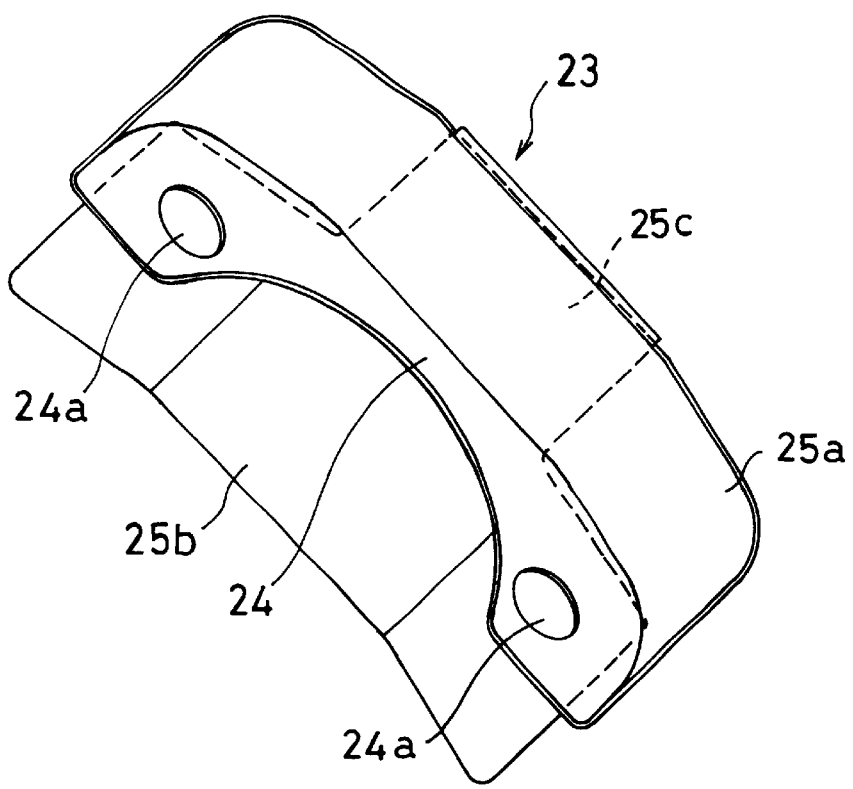
FIG. 10 is a perspective view thereof.

In FIGS. 4 through 6, the construction of the main portion of the catalyst container itself is substantially the same as the above-described embodiment. Therefore, its explanation is partially omitted, and the following explanation is mainly focused on the arrangement which is different from the above-described embodiment.

Reference numeral 11 denotes a catalyst container, reference numeral 12 denotes a casing portion thereof, reference numeral 13 denotes a cylindrical body thereof, reference numeral 14 denotes a front coned portion, and reference numeral 15 denotes a rear coned portion. To the rear end (i.e., the right side in FIG. 4 which is a downstream side of the exhaust gas flow) of the rear coned portion 15, there is welded a triangular flange 16. A catalyst carrier 17 is rolled inside a sealing mat 18 which has thermal insulating characteristics, and is inserted or accommodated into the cylindrical body 13 which has not been welded yet. After appropriately tightening the cylindrical body, the longitudinally or axially extending edge 13a is welded to the outer circumference of the cylindrical body 13. The catalyst carrier 17 is thus contained inside the cylindrical body 13. On a large diameter side of each of the front and rear coned portions 14, 15, there is formed a flange 14a, 15a. These flanges 14a, 15a are welded to the longitudinal ends of the cylindrical body 13.

A flange 19 which is of the same shape as the flange 16 on the rear end of the rear coned portion 15 is welded to the front end of an exhaust gas pipe 20. A bolt hole 16a, 19a is formed in each of the triangular cover portions of the flanges 16, 19 for fixing with a bolt 21 and a nut 22. These flanges 16, 19 are welded so that two, out of three, of the bolt holes are positioned in the bottom and the remaining one bolt hole is positioned in the top of the triangular shape. The lower two bolt holes are used for attaching a heat shield cover 23 to the catalyst container 11.

As shown in FIGS. 7 through 10, the heat shield cover 23 is made up of an arch-shaped mounting or attaching flange 24 and a cover portion 25 which extends therefrom. The cover portion 25 has a rear cover portion 25a and a front cover portion 25b. The rear cover portion 25a is formed by extending the mounting flange 24 rearward so as to form the shape of a trough. From the extended rear central portion, a narrow intermediate portion 25c is bent again in the forward direction. In a portion in which the intermediate portion 25c lies beyond (i.e., exceeds in the forward direction) the mounting flange 24, a front cover 25b of larger width (larger than the intermediate portion 25c) is continuously provided. The mounting flange 24 is arranged to extend so as to abut with an upstream surface of the lower part of the flange 16 and is provided with a pair of bolt holes 24a, 24a. The bolt holes 24a are provided coaxially with the two bolt holes 16a, 19a that are formed on the lower side of the flanges 16, 19. Bolts 21 are inserted into the flanges 16, 19 from the side of the mounting flange 24 (i.e., from the upstream side), and the nuts 22 are then tightened. In this case, the head side of each of the bolts 21 must be provisionally fixed by a suitable means to the flange 24, or a spanner must be used, to prevent the bolts from rotating. Or else, a serration may be formed in the flange of the coned portion to prevent the bolts from rotating.

The front cover 25b which constitutes the main portion of the cover portion 25 is bent at its both sides into a substantially U-shape. The length L1 in the direction of the flow of the exhaust gases of the front cover 25b is approximately equal to the length of the rear coned portion 15. The rear cover 25a has a shape which is bent along the bottom portion of the flanges 16, 19. The length L2 in the direction of the flow of the exhaust gases of the rear cover 25a is approximately equal to the sum of the thicknesses of the flanges 16, 19. The front cover 25b and the rear cover 25b are arranged to cover the bottom portion of the coned portion 15 and the flanges 16, 19.

Figure 11:
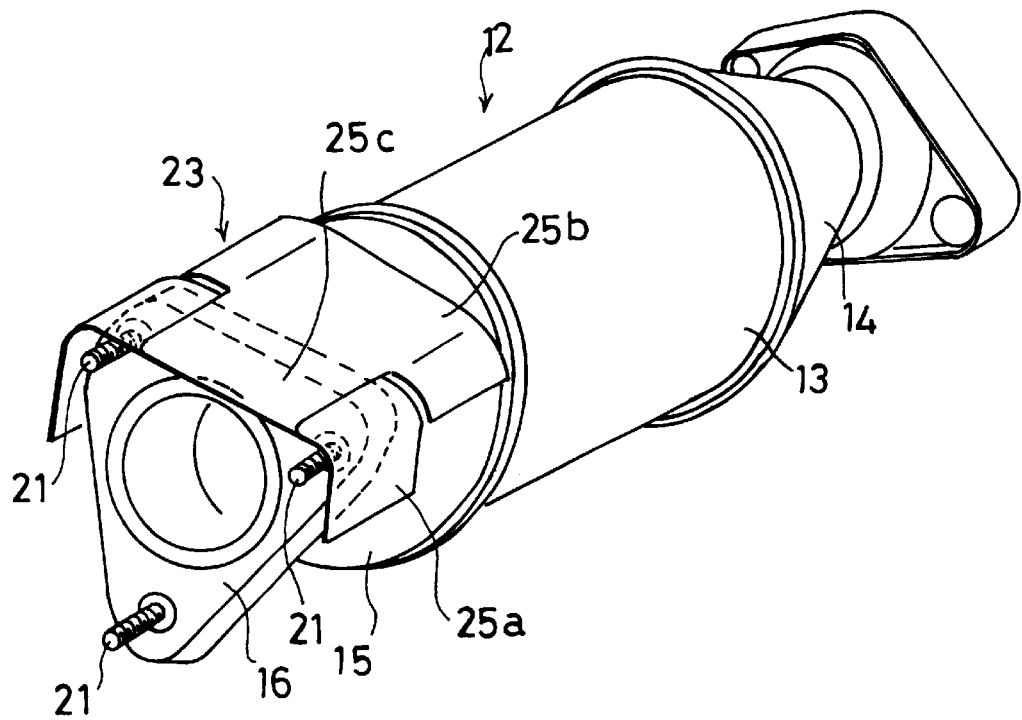
FIG. 11 is a perspective view thereof, shown upside down, in the process of assembling.
Figure 12A:
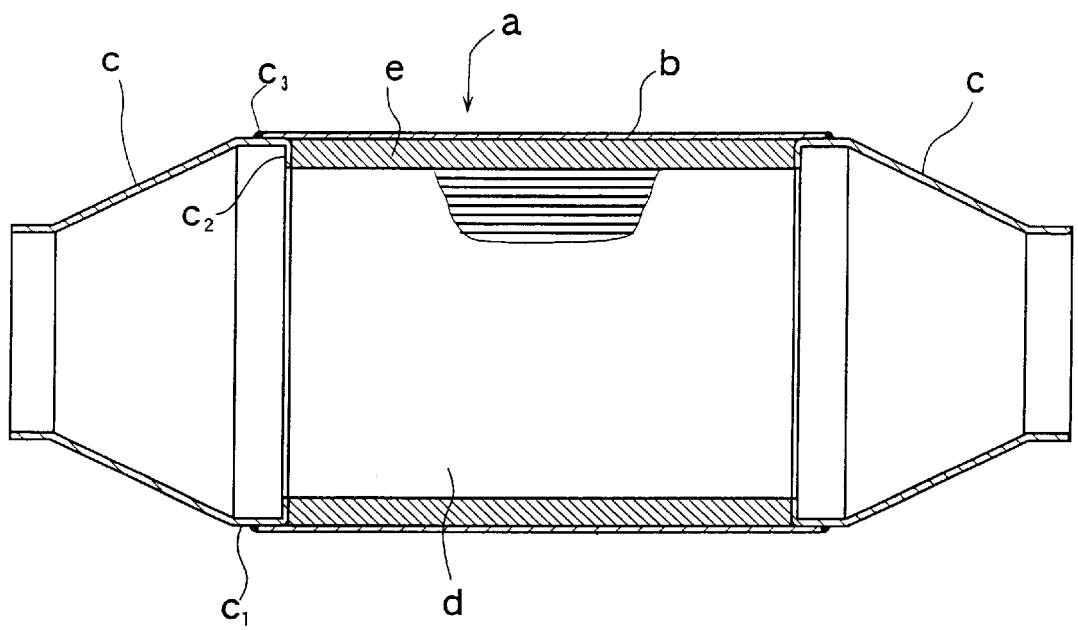
FIG. 12A is a longitudinal sectional view of a conventional catalyst container.
Figure 12B:
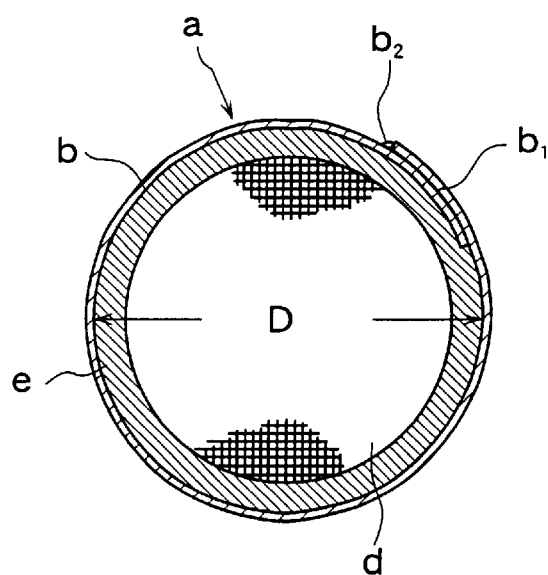
FIG. 12B is a front sectional view thereof.

FIG. 11 shows, upside down, the casing portion 12 of the catalyst container 11 which has mounted thereon the heat resistant cover 23 and the bolts 21. The flange 19 of the exhaust gas pipe 20 is engaged with the casing 12 of the catalyst container 11 and are tightened with the nuts 22. Since there is a sufficient space behind the rear cover 25a, the tool for tightening the nuts 22 can be easily operated therein.

In the above-described embodiment, the means for forming the cover portion 25 is arranged as follows. Namely, the rear cover 25a is bent backward from the mounting flange 24 and the front cover 25a is then bent forward therefrom. However, an opposite arrangement may also be employed. Namely, the front cover 25b is bent forward from the mounting flange 24, and the front cover 25b is then bent backward from the neighborhood of the front end of the rear coned portion 15 to thereby extend it to the bottom portion of the flanges 16, 19. The backwardly extended portion is thus formed as the rear cover 25a.

As can be seen from the above explanations, in the first aspect of the present invention, the forming of the cylindrical body and the coned portion is easy. Further, the welding portion of the cylindrical portion and the coned portion is arranged to come into abutment with each other without fitting one of them into the other thereof, the welding can be carried out even if the diameter of the cylindrical body has some deviation or fluctuation. In addition, a large allowance for welding can be secured. Still furthermore, the fillet welding between the cylindrical portion and the coned portion can secure a large welding strength. Further, since there are no parts to be fitted, the dimensional accuracies of both the cylindrical portion and the coned portion need not be high.

According to another aspect of the present invention, the heat shield cover is mounted by utilizing the bolts for coupling the flanges on the catalyst container and the flange on the exhaust pipe on the downstream side of the catalyst container. Therefore, the number of parts required for assembling can be reduced. In addition, since the heat shield cover is arranged to cover only the rear coned portion and the flanges to couple the rear coned portion that are heated to a high temperature by the exhaust gases, the heat shielding function can be performed by a minimum of a single part. Therefore, the weight and cost can be reduced.

It is readily apparent that the above-described catalyst container meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing a catalyst container comprising the steps of:

a) rolling a rectangular metallic sheet plate into a cylindrical body with a longitudinally overlapped edge;

b) forming said cylindrical body wherein an inner diameter of said cylindrical body in a free state is smaller than the inner diameter of said cylindrical body after a catalyst carrier has been inserted into said cylindrical body;

c) expanding said cylindrical body against a resilient force and inserting into said cylindrical body said catalyst carrier around which a sealing mat is rolled such that said sealing mat is shorter in length than the catalyst carrier;

d) filling said cylindrical body with said catalyst carrier around which said sealing mat is rolled, wherein each axial end of said catalyst carrier lies at an axially inward position relative to each axial end of said cylindrical body, said sealing mat being shorter in length than said catalyst carrier so as to form a clearance between said each axial end of said sealing mat and said each axial end of said catalyst carrier;

e) reducing a diameter of said cylindrical body wherein a sufficient compression force is applied to said sealing mat;

f) welding said longitudinally overlapped edge;

g) forming a pair of coned portions each having a first diameter portion and a second diameter portion, said second diameter portion being larger than said first diameter portion and having a flange which extends radially outward, a diameter of an intermediate portion of said flange being substantially equal to a diameter of said cylindrical body;

h) aligning each axial end of said cylindrical body to that surface of each of said flanges which faces said cylindrical body in a coaxial relationship with each other; and i) fillet-welding each end of said axial ends of said cylindrical body and each of said flanges together along an entire circumference of an outer corner in the front end and the rear end formed by each of said flanges and said cylindrical body.

* * * * *